US007627732B2

(12) United States Patent
Coteus et al.

(10) Patent No.: US 7,627,732 B2
(45) Date of Patent: *Dec. 1, 2009

(54) MEMORY SYSTEMS FOR AUTOMATED COMPUTING MACHINERY

(75) Inventors: Paul W. Coteus, Yorktown Heights, NY (US); Kevin C. Gower, LaGrangeville, NY (US); Robert B. Tremaine, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/102,034

(22) Filed: Apr. 14, 2008

(65) Prior Publication Data

US 2008/0215790 A1    Sep. 4, 2008

Related U.S. Application Data

(63) Continuation-in-part of application No. 11/426,047, filed on Jun. 23, 2006.

(51) Int. Cl.
G06F 12/00 (2006.01)
G06F 13/00 (2006.01)
G06F 13/28 (2006.01)
H04L 12/50 (2006.01)
H04Q 11/00 (2006.01)

(52) U.S. Cl. ...................... 711/170; 370/360

(58) Field of Classification Search ................. 711/5, 711/170; 710/308; 370/360
See application file for complete search history.

(56) References Cited

U.S. PATENT DOCUMENTS

| 4,007,452 | A | * | 2/1977 | Hoff, Jr. ...................... 365/63 |
| 5,568,046 | A | * | 10/1996 | Samela et al. .............. 324/71.1 |
| 6,381,688 | B1 | * | 4/2002 | Gates et al. .................. 712/32 |
| 6,487,624 | B1 | * | 11/2002 | Erickson et al. ............. 710/302 |
| 2007/0297397 | A1 | * | 12/2007 | Coteus et al. ............... 370/360 |

OTHER PUBLICATIONS

Draft Standard For A High-Speed Memory Interface (SyncLink); IEEE Standards Department; 1996; 66pgs; Draft 0.99 IEEE P1596.7-199X; Institute of Electrical and Electronics Engineers, Inc.; New York, NY USA.

* cited by examiner

*Primary Examiner*—Sheng-Jen Tsai
(74) *Attorney, Agent, or Firm*—Biggers & Ohanian, LLP

(57) ABSTRACT

Design structures embodied in machine readable medium are provided. Embodiments of the design structure include a memory system comprising: a memory controller; a memory bus terminator; a high speed memory bus that interconnects the memory controller, the memory bus terminator, and at least one memory module; and the at least one memory module, the memory module comprising at least one memory hub device, high speed random access memory served by the memory hub device, two bus signal ports, and a segment of the high speed memory bus fabricated on the memory module so as to interconnect the bus signal ports and the memory hub device, the high speed memory bus connected to the memory hub device by a negligible electrical stub.

13 Claims, 9 Drawing Sheets

MEMORY SYSTEMS FOR AUTOMATED COMPUTING MACHINERY

CROSS-REFERENCE TO RELATED APPLICATION

This application is a continuation-in-part application of and claims priority from U.S. patent application Ser. No. 11/426,047, filed on Jun. 23, 2006.

BACKGROUND OF THE INVENTION

1. Field of the Invention

The field of the invention is related to a design structure, and more specifically to a design structure for memory systems for automated computing machinery.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Contemporary high performance computing main memory systems incorporate memory devices in an array of dynamic random access memory ('DRAM') devices. FIG. 1 illustrates an example of a prior art memory system that includes a memory controller (102), memory modules (106, 108, 110), memory hub devices (118, 120, 122), and memory devices (112, 114, 116) organized in a hub-and-spoke topology with the memory hub devices as 'hubs' and the memory devices as the 'spokes.' The memory controller (102) is interconnected to a system processor (104) through a physical, high speed frontside bus (176), and the memory controller (102) is interconnected to the memory hub devices (118, 120, 122) through a physical high speed memory bus (136) and bus stubs (124, 126, 128). The high speed memory bus (136) is terminated in its characteristic impedance by memory bus terminator (130). Each memory hub device provides one or more lower speed independent connections to banks of memory devices (112, 114, 116). The example of FIG. 1 illustrates only one 'channel' (134) or network of memory hub devices connected by a bus and bus stubs to a memory controller. Practical memory systems, however, typically may be implemented with additional such channels or networks (138) as well.

In the example of FIG. 1, the high speed memory bus (136) is a set of parallel conductive pathways that conduct memory signals at very high frequencies, often in excess of a gigahertz. Such a high speed memory bus functions as a transmission line or a group of transmission lines. A bus stub is an additional section of such transmission line, connected in parallel to the main line, that connects the bus proper to a memory hub device. A bus stub may be connected between the main bus and a memory hub device by soldered interconnects, connectors, pressure contacts, conductive adhesives, optical interconnects, and other communication and power delivery methods. A high speed memory bus, like any transmission line, has a characteristic impedance at its typical operating frequency or range of operating frequencies. A high speed memory bus, like any transmission line, suffers from noise and crosstalk and requires power to drive signals on the bus. Terminating the high memory bus in a memory bus terminator (130) having the same impedance as the characteristic impedance of the high speed memory bus helps to minimize noise and crosstalk on the bus and helps to minimize the power requirements for driving memory signals on the bus.

All connections to bus stubs affect the characteristic impedance of the high speed memory bus at the point of the connection, causing reflections of part of the signals on the bus, increasing bus noise, increasing crosstalk among conductive pathways of the bus, and increasing power requirements to drive signals on the bus. As computer technology advances, memory requirements and memory speed requirements are more and more demanding. Memory bus frequencies climb higher and higher, and the use of memory architectures with bus stubs like the one illustrated in FIG. 1 become more and more difficult. The benefit of an architecture like the one in FIG. 1 is flexibility. The memory system of FIG. 1 is illustrated with only three bus stubs and only three memory modules. As a practical matter, however, such a system may be implemented with any number of physical connectors so that users can insert or remove memory modules as desired. Of course, each such insertion or removal affects the bus impedance and the noise, crosstalk, and power requirements of the bus. As memory bus frequencies increase, an architecture like the one in FIG. 1 eventually becomes impractical, despite its benefits.

FIG. 2 illustrates an example of an integrated circuit of a kind that was used to implement a prior art memory hub device (118). The integrated circuit of FIG. 2 is implemented as an integrated circuit die (100) encapsulated in an integrated circuit package (136). Conductive pathways (138, 140, 142, 144) of a high speed memory bus are brought in to the integrated circuit package (136) die through package pins (137) as part of a bus stub connecting the circuit of FIG. 2 to a high speed memory bus. Conductive pathways (148, 150, 152, 154) inside the die are connected to conductive pathways of the bus outside the die (but still inside the integrated circuit package) through die pads (146). The conductive pathways inside the die connect bus signals to logic circuitry (170, 174) of the die through communications circuits (158, 164). In this example, even the small conductive pathways inside the die represent disruptions of the bus impedance that increase bus noise, crosstalk, and power requirements. Even if it is only the small conductive pathways inside the die itself that present the stub effect disrupting bus impedance, use of such an architecture becomes impractical at high bus speeds.

FIG. 3 illustrates a prior art memory architecture with cascaded memory hub devices, an architecture that was developed at least partly to try to overcome the problems with memory bus stubs. The memory controller (102) is interconnected to a system processor (104) through a physical, high speed frontside bus (176). Rather than connecting memory modules with multiple connections to a memory bus through bus stubs that affect bus impedance, however, each memory hub device (118, 120, 122) in the system of FIG. 3 is connected to just one other device, either the memory controller (102) or another memory hub device, through a single point to point link (178, 180, 182). Like a memory bus, a link is a set of parallel conductive pathways for conducting memory signals between a memory controller and a memory module, or between memory modules. Unlike a bus, a link makes only one such connection, well terminated on each end in the characteristic impedance of the link. No stubs are attached, so no stub can affect the impedance of the link.

Memory access latency in memory system network topologies composed of cascaded memory hub devices together with point-to-point electrical or optical links is degraded by having to propagate through each memory hub device in a cascaded network of memory hub devices between a particular rank of memory devices and a memory controller. Communications of signals in this network are synchronized, typically with respect to a memory bus clock signal. Memory signals, both instructions and data to be written or read, outbound from the memory controller are cached at least briefly in each memory hub device, resynchronized, and retransmitted on the next outbound link. Inbound memory signals also are cached, resynchronized, and retransmitted until they arrive in the memory controller. Take, for example, the transition delay for signal transition across a memory hub device as one unit of latency. The latency for transmission of memory signals between memory controller (102) and memory devices (112) served by memory hub device (118) may be said to have a value of 1. The latency for transmission of memory signals between memory controller (102) and memory devices (114) served by memory hub device (120) has a value of 2. And so on. Even though memory signals are resynchronized and retransmitted as fast as possible, latency always varies across ranks of memory served by the various memory hub devices in such an architecture.

In addition to issues with memory access latency, power consumption and cost for interfaces are both maximized by having point-to-point network connections. In the memory system of FIG. 1, for example, the memory controller and each memory hub device drives output memory signals across the full width of each link. If there are 10 lines in an outbound link, the memory controller or memory hub device driving the link has 10 output drivers in its output interface to the link with a power requirement to supply all 10 drivers. For all these reasons, there is an ongoing need for innovation in the field of memory systems.

SUMMARY OF THE INVENTION

Design structures embodied in machine readable medium are provided. Embodiments of the design structure include a memory system comprising: a memory controller; a memory bus terminator; a high speed memory bus that interconnects the memory controller, the memory bus terminator, and at least one memory module; and the at least one memory module, the memory module comprising at least one memory hub device, high speed random access memory served by the memory hub device, two bus signal ports, and a segment of the high speed memory bus fabricated on the memory module so as to interconnect the bus signal ports and the memory hub device, the high speed memory bus connected to the memory hub device by a negligible electrical stub.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 4:
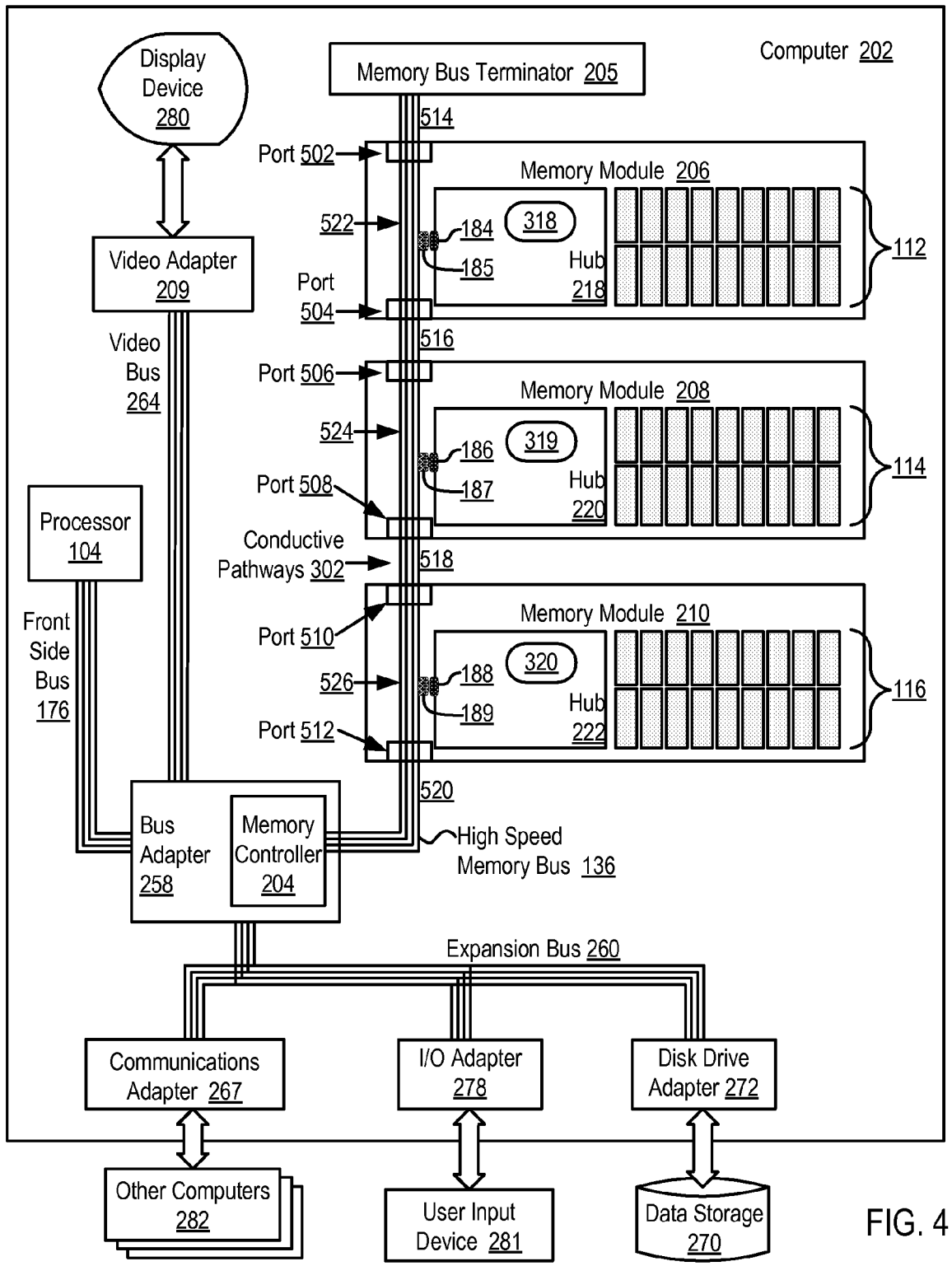
FIG. 4 sets forth a block diagram of automated computing machinery comprising an example of a computer useful with memory systems according to embodiments of the present invention.

Exemplary memory systems according to embodiments of the present invention are described with reference to the accompanying drawings, beginning with FIG. 4. Memory systems according to embodiments of the present invention are generally implemented with computers, that is, with automated computing machinery. FIG. 4 therefore sets forth a block diagram of automated computing machinery comprising an exemplary computer (202) useful with memory systems according to embodiments of the present invention. The computer (202) of FIG. 4 includes at least one computer processor (104) or 'CPU' as well as three memory modules (206, 208, 210) connected through a high speed memory bus (136) to memory controller (204). Memory controller (204) in this example is integrated within a bus adapter (258) that further connects the memory modules to processor (104) and to other components of the computer.

Memory modules (206, 208, 210) useful in memory systems for automated computing machinery according to embodiments of the present invention include a memory hub device (218, 220, 222) that communicates memory signals to and from random access memory. Such memory modules (206, 208, 210) also include ransom access memory, illustrated in this example as banks of separate random access memory devices (112, 114, 116), although this architecture is for explanation only, not for limitation of the invention. Random access memory served by a memory hub device on a memory module may, for example, be implemented as random access memory fabricated within the memory hub device itself rather than in separate memory devices—and also in other ways as will occur to those of skill in the art.

Bus adapter (258) is a computer hardware component that contains drive electronics for high speed buses, the front side bus (176), the video bus (264), and the memory bus (136), as well as drive electronics for the slower expansion bus (260). Examples of bus adapters useful in computers with memory systems improved according to embodiments of the present invention include the Intel Northbridge, the Intel Memory Controller Hub, the Intel Southbridge, and the Intel I/O Controller Hub. Examples of expansion buses useful in computers according to embodiments of the present invention include Industry Standard Architecture ('ISA') buses and Peripheral Component Interconnect ('PCI') buses. In this example, the memory controller (204) is integrated within the bus adapter, but this arrangement is not a requirement of the present invention. The memory controller may be implemented within a bus adapter in a chip set, as shown here, or the memory controller may be implemented in a separate chip or separate integrated circuit package. Similarly, the video adapter (209), shown here separated from the bus adapter (258), also may be integrated within the bus adapter in some embodiments.

The computer (202) of FIG. 4 includes disk drive adapter (272) coupled through expansion bus (260) and bus adapter (258) to processor (104) and other components of the computer. Disk drive adapter (272) connects non-volatile data storage to the computer in the form of disk drive (270). Disk drive adapters useful in computers with memory systems according to embodiments of the present invention include Integrated Drive Electronics ('IDE') adapters, Small Computer System Interface ('SCSI') adapters, and others as will occur to those of skill in the art. In addition, non-volatile computer memory may be implemented for a computer as an optical disk drive, electrically erasable programmable read-only memory ('EEPROM' or 'Flash' memory), RAM drives, and so on, as will occur to those of skill in the art.

The example computer of FIG. 4 includes one or more input/output ('I/O') adapters (278). I/O adapters in computers implement user-oriented input/output through, for example, software drivers and computer hardware for controlling output to display devices such as computer display screens, as well as user input from user input devices (281) such as keyboards and mice. The example computer of FIG. 4 includes a video adapter (209), which is an example of an I/O adapter specially designed for graphic output to a display device (280) such as a display screen or computer monitor. Video adapter (209) is connected to processor (104) through a high speed video bus (264), bus adapter (258), and the front side bus (176), which is also a high speed bus.

The exemplary computer (202) of FIG. 4 includes a communications adapter (267) for data communications with other computers (282). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful in computers with memory systems according to embodiments of the present invention include modems for wired dial-up communications, Ethernet (IEEE 802.3) adapters for wired data communications network communications, and 802.11 adapters for wireless data communications network communications.

The memory controller (204) is a circuit that translates system requests from system processor (104) for memory access into packets according to a memory system network communication protocol. A memory 'write' packet of such a protocol may include a command ('read' or 'write'), an address, and associated data. A memory 'read' packet may include a command and address. Memory read packets imply an expected packet will be returned to the memory controller containing data read from memory. Data and command communications on such a system are typically so synchronized that the memory controller always knows which received read data goes with which transmitted read request.

The high speed memory bus (136) is terminated in its characteristic impedance by memory bus terminator (205). The memory bus terminator (205) may be implemented as a passive resistor network. Alternatively, the memory bus terminator (205) may be implemented as an active termination by adding voltage regulators to the resistors used in passive termination to allow for more reliable and consistent termination of the bus. Active termination may include diode clamps added to the circuitry to force the termination to the correct voltage, which typically reduces to insignificance any signal reflections that might otherwise be caused by an impedance mismatch at the terminator. In addition, the memory bus terminator may be implemented in other ways as may occur to those of skill in the art, and the use of all such memory bus terminations are well within the scope of the present invention.

The high speed memory bus (136) in this example interconnects the memory controller (204), the memory bus terminator (205), and the memory module (206, 208, 210). The high speed memory bus (136) is 'high speed' in the sense that it operates at bus speeds for which small impedance mismatches in connections to the bus risk significant degradation of bus performance in terms of noise, crosstalk, and power requirements. Such bus speeds are typically in excess of a gigahertz, although in some embodiments, bus speeds may be less than a gigahertz. The high speed memory bus (136) is composed of at least one conductive pathway that conducts memory signals from the memory controller (204) the memory hub devices (218, 220, 222) on the memory modules (206, 208, 210). For convenience of explanation, the high speed memory bus (136) in this example is shown with four conductive pathways (302) comprising the bus, but high speed memory buses according to embodiments of the present invention may be implemented with any number of conductive pathways.

Each memory module (206, 208, 210) in this example includes two bus signal ports (502, 504, 506, 508, 510, 512), and a segment (522, 524, 526) of the high speed memory bus fabricated on the memory module so as to interconnect the bus signal ports and the memory hub devices (206, 208, 210). A bus signal port (502, 504, 506, 508, 510, 512) is an interconnection for memory signals between a segment (514, 516, 518, 520) of the high speed memory bus off a memory module and a segment (522, 524, 526) of the high speed memory bus on a memory module.

The high speed memory bus (136) in this example is connected to each memory hub device (218, 220, 222) by a negligible electrical stub. The negligible electrical stubs here are implemented with high speed bus contacts and die pads of the memory hub devices fabricated in direct contact with one another, with no intervening conductive pathways. The high speed memory bus (136) in this example includes high speed bus contacts (185, 187, 189) on the segments of the bus on the memory modules, fabricated in direct contact with the conductive pathways (302) of the high speed memory bus (136). Each memory hub device (218, 220, 222) is composed of an integrated circuit that in turn includes at least one data communications circuit (318, 319, 320) and a die pad (184, 186, 188). Each data communications circuit (318, 319, 320) is connected to the memory bus through the die pad (184, 186, 188) and the high speed bus contact (185, 187, 189).

Figure 5:
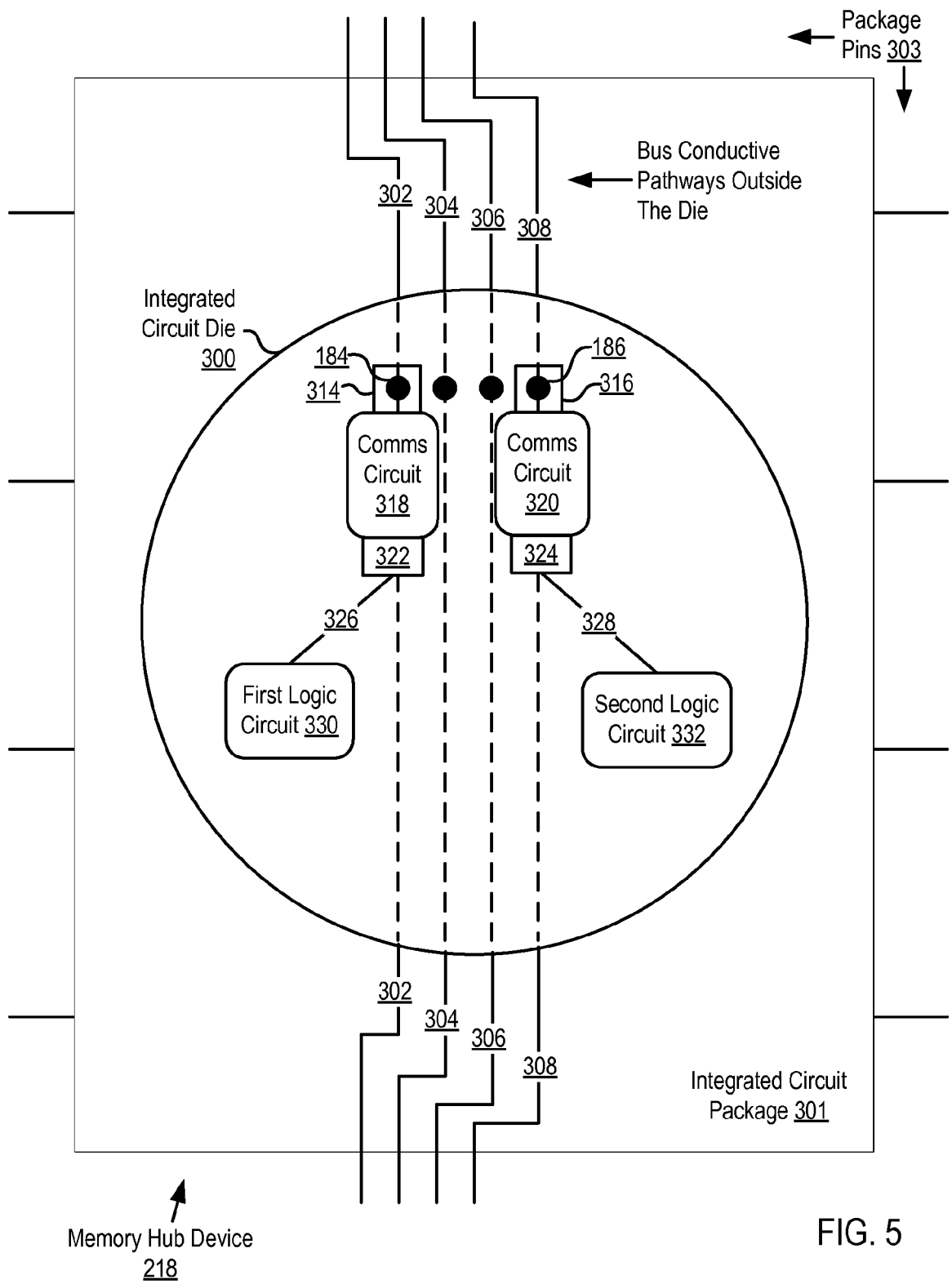
FIG. 5 sets forth a functional block diagram of an exemplary memory hub device useful in a memory system according to embodiments of the present invention.

In the memory system of FIG. 4, the high speed memory bus (136) is characterized by a characteristic impedance. The fact that the high speed bus contacts (185, 187, 189) are fabricated in direct contact with a die pad of a memory hub device and the communications circuits (318, 319, 320) are positioned within the integrated circuit, the memory hub devices, in close proximity to the die pad provide conductive pathways between the high speed memory bus (136) and the data communications circuits (318, 319, 320) that are so short as to have no significant effect on the characteristic impedance of the high speed memory bus. That is, the conductive pathway formed by a high speed bus contacts and a die pad of a memory hub device form a conductive pathway between the high speed memory bus and the communications circuit of the memory hub device that is a negligible electrical stub, so short as to have either no significant effect on memory bus impedance or none at all. The negligible electrical stub are conductive pathways no more than 2.0 millimeters in length, formed by the high speed bus contacts (185, 187, 189) and the die pads (184, 186, 188), between the high speed memory bus (136) and the data communications circuits (318, 319, 320). Readers of skill in the art will recognize that the memory system architecture illustrated in FIG. 4 effectively implements a high speed wired-OR connection among the memory controller (204) and the memory hub devices (218, 220, 222) on the memory modules (206, 208, 210). For further explanation, FIG. 5 sets forth a functional block diagram of an exemplary memory hub device (218) useful in a memory system according to embodiments of the present invention. The memory hub device of FIG. 5 is implemented as an integrated circuit die (300) encapsulated in an integrated circuit package (301). Conductive pathways (302, 304, 306, 308) of a high speed memory bus are brought in to the integrated circuit package (301) die through package pins (303) connecting the circuit of FIG. 5 to a memory controller. Bus signals are connected (326, 328) to logic circuitry (330, 332) of the die through communications circuits (318, 320) that have inputs (314, 316) and outputs (322, 324).

Figure 2:
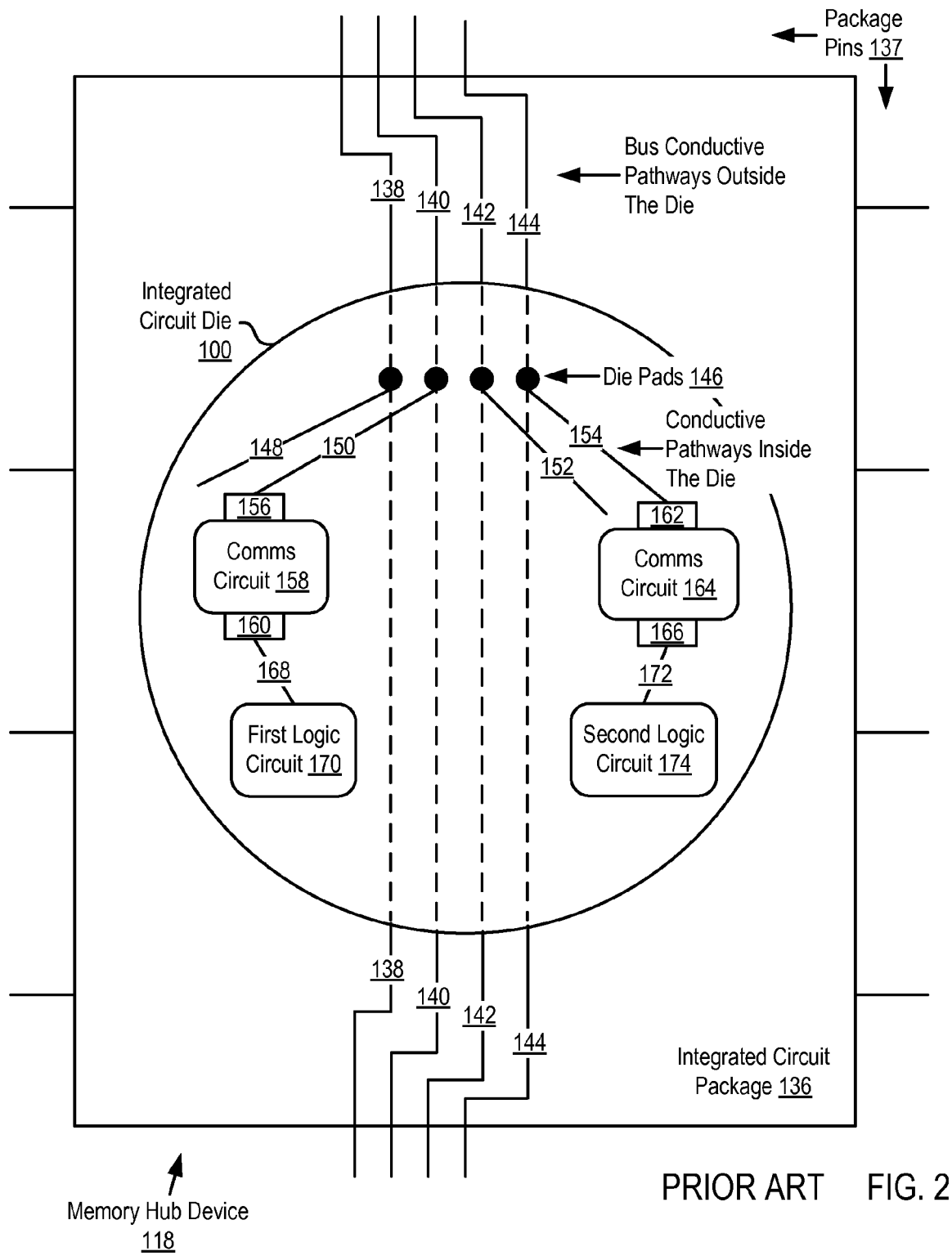
FIG. 2 illustrates an example of an integrated circuit of a kind that was used to implement a prior art memory hub device.
Figure 3:
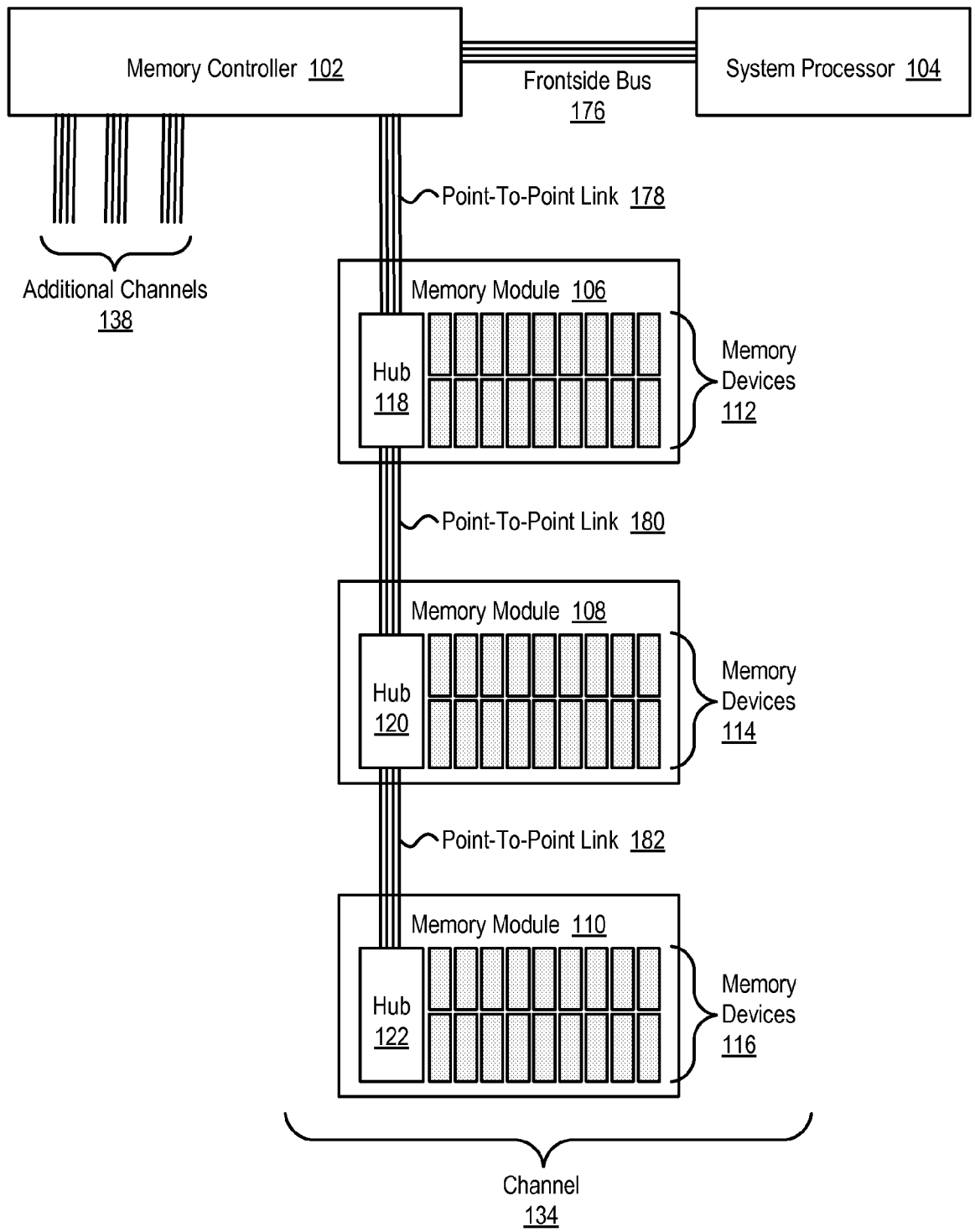
FIG. 3 illustrates a prior art memory architecture with cascaded memory hub devices.

Unlike the prior art integrated circuit of FIG. 2, in the example of FIG. 5, there are no conductive pathways (150, 152 on FIG. 2) to the data communications circuits inside the die connected to conductive pathways of the bus outside the die through die pads. Instead, in this example, a high speed bus contact is positioned in close proximity to a die pad of the memory hub device by positioning the high speed bus contact in alignment on a central axis through the die pad and the data communications circuit, where the high speed bus contact is connected directly to the die pad with no intervening conductive pathway. In fact, the high speed bus contact is so positioned in this example that it is directly below the die pad and therefore not seen at all in this illustration.

What is seen is the input (314) of communications circuit (318) positioned directly over die pad (184), and the input (316) of communications circuit (320) positioned directly over die pad (186). The view is from the top of the circuit after the integrated circuit die (300) has been flipped onto a planar surface in the integrated circuit package (301). Before the chip was flipped, the inputs (314, 316) of the communications circuits (318, 320) were deposited, doped, and etched on the integrated circuit die (300) in a physical position on the die determined by the design pattern of the die pads. The inputs were fabricated on the die so that die pads in their intended pattern with other die pads could be fabricated directly on top of the inputs to the communications circuits.

The contacts, lands, pads, vias, and the like of the planar of the integrated circuit package, some of which are high speed memory bus contacts, also have a pattern, and the die pad for the inputs to the communications circuits are selected so that they will contact high speed memory bus contacts when the chip is flipped into the integrated circuit package. Then when the chip is flipped onto a planar containing a pattern of contacts, some of which are high speed bus contacts, the high speed bus contact is connected directly to the die pad which in turn is connected directly to the input of the communications circuit with no intervening conductive pathway, thereby forming a negligible electrical stub, a conductive pathway between the high speed memory bus and the communications circuit of the memory hub device that is so short as to have either no significant effect on memory bus impedance or none at all. The negligible electrical stub are conductive pathways no more than 2.0 millimeters in length, formed by high speed bus contacts and die pads (184, 186), between conductive pathways (302, 308) of a high speed memory bus and data communications circuits (318, 320).

Figure 6:
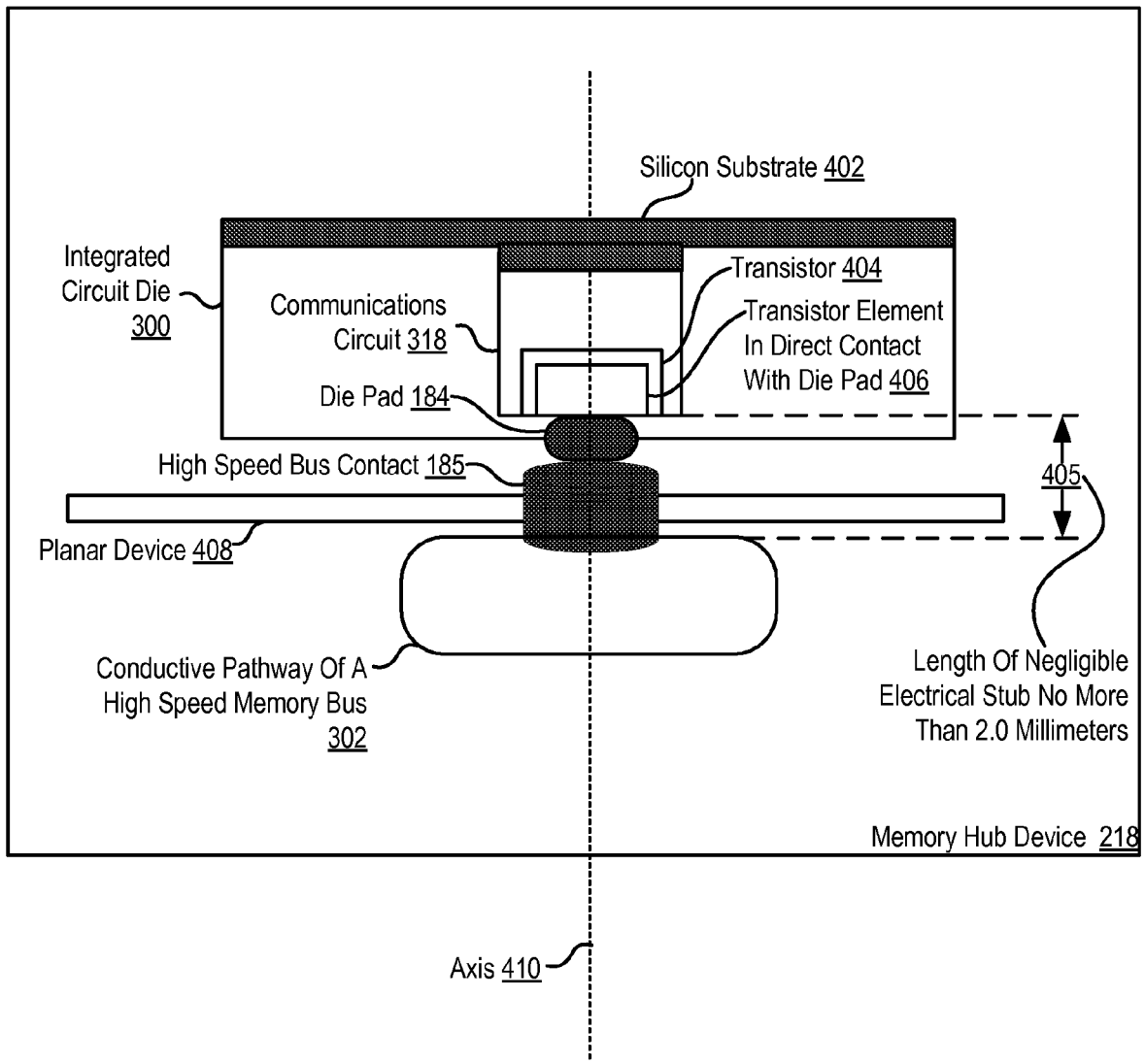
FIG. 6 sets forth a functional block diagram of a further exemplary memory hub device useful in a memory system according to embodiments of the present invention.

For further explanation, FIG. 6 sets forth a functional block diagram of a further exemplary memory hub device (218) useful in a memory system according to embodiments of the present invention. The example memory hub device of FIG. 6 includes an integrated circuit die (300) that has been flipped for installation on a planar device (408). The planar device is any device that can support the lands, vias, pads, and the like that form a high speed memory bus and high speed memory bus contacts. Examples of such planar devices include integrated circuit packaging, printed circuit boards, motherboards, and backplanes of computer memory systems. The silicon substrate (402) of the integrated circuit die is at the top, having been flipped, and fabricated upon it is a communications circuit (318). The communications circuit may be a transmitter or a receiver. The communications circuit includes a transistor (404) that in turn includes a transistor element (406) fabricated in direct contact with a die pad (184). In fact, the die pad may be deposited directly on the transistor element with no intervening conductive pathway.

In the example of FIG. 6, the data communications circuit (318) may be a receiver circuit, where the transistor (404) is an input transistor of the receiver circuit, and the transistor element in direct contact with the die pad is a gate of the transistor with the die pad directly deposited upon it. That is, the data communications circuit in such an example may be positioned within the integrated circuit so as to form a negligible electrical stub by fabricating the die pad in direct contact with the input transistor with no intervening conductive pathway. In such an example, the negligible electrical stub is composed of the high speed bus contact (185) connected directly to the die pad (184) forming a conductive pathway (405) no more than 2.0 millimeters in length between the conductive pathway (302) of a high speed memory bus and the input transistor (404).

In the example of FIG. 6, the data communications circuit (318) may be a transmitter circuit, where the transistor (404) is an output transistor of the transmitter circuit, and the transistor element in direct contact with the die pad is a source or drain of the transistor with the die pad directly deposited upon it. That is, the data communications circuit in such an example may be positioned within the integrated circuit so as to form a negligible electrical stub by fabricating the die pad in direct contact with the output transistor with no intervening conductive pathway. In such an example, the negligible electrical stub is composed of the high speed bus contact (185) connected directly to the die pad (184) forming a conductive pathway (405) no more than 2.0 millimeters in length between the conductive pathway (302) of a high speed memory bus and the output transistor (404).

In addition, the memory hub device in the example of FIG. 6 is fabricated with a high speed bus contact (185) positioned in close proximity to the die pad (184) by positioning the high speed bus contact in alignment on a central axis (410) through the die pad (184) and the data communications circuit (318), so that the high speed bus contact (185) is connected directly to the die pad (184) with no intervening conductive pathway. The high speed bus contact (185) may be implemented as a land, pad, via, or other contact of a planar device (408), such as a motherboard, backplane, printed circuit board, or the like, that connects signals from the communications circuit (318) and the die pad (184) to a conductive pathway (302) of a high speed memory bus.

Figure 7:
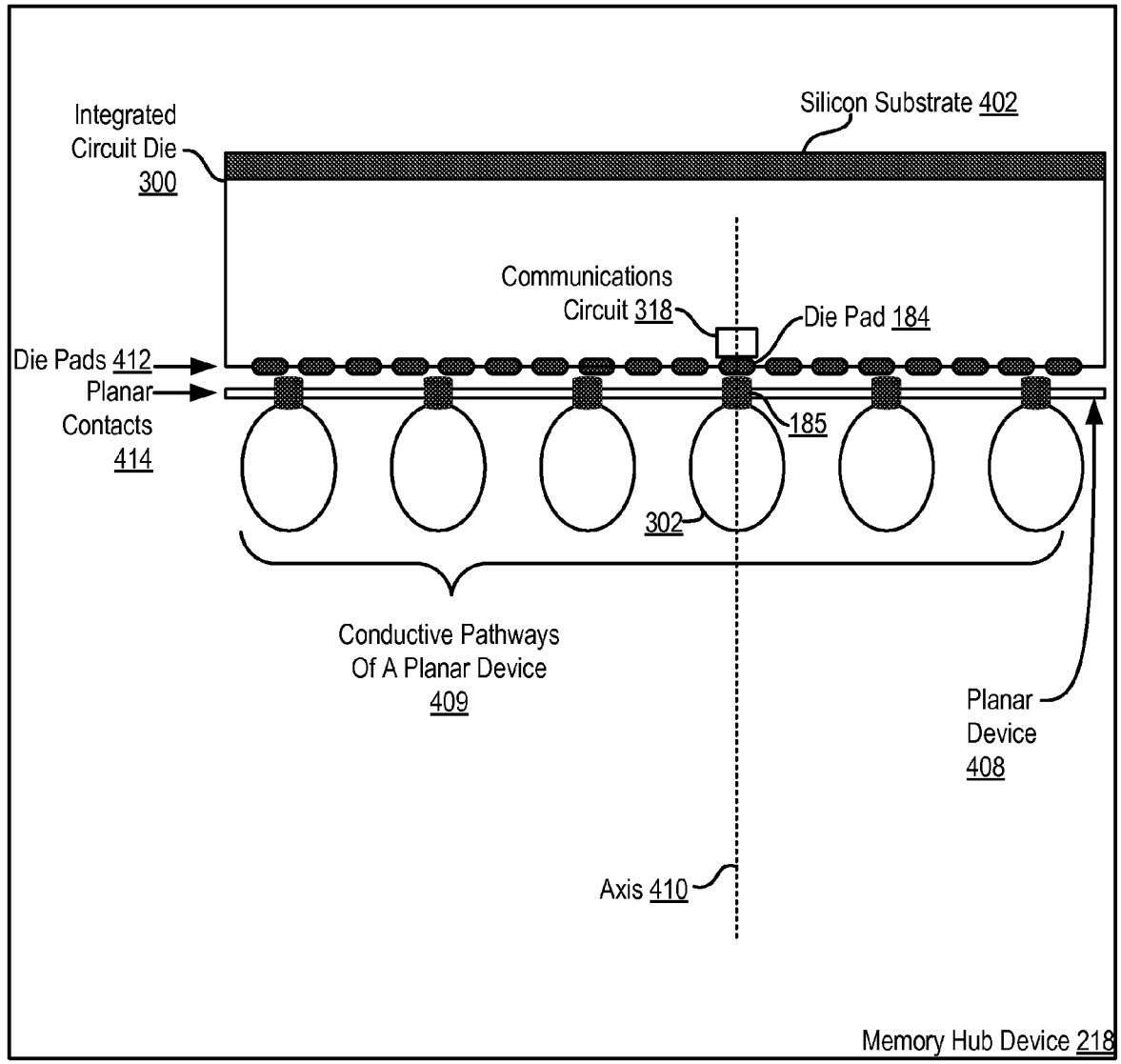
FIG. 7 sets forth a functional block diagram of a further exemplary memory hub device useful in a memory system according to embodiments of the present invention.

For further explanation, FIG. 7 sets forth a functional block diagram of a further exemplary memory hub device (218) useful in a memory system according to embodiments of the present invention. The example memory hub device of FIG. 7 includes an integrated circuit die (300) that has been flipped for installation onto a planar device (408) to provide conductive contact with conductive pathways (409) of the planar device. The conductive pathways (409) of the planar device include at least one conductive pathway (302) of a high speed memory bus. The integrated circuit die includes a communications circuit (318). The communications circuit (318) may be a transmitter or a receiver. The communications circuit (318) has a die pad (184) fabricated directly on the communications circuit with no intervening conductive pathway. In addition, the memory hub device in the example of FIG. 7 is fabricated with a high speed bus contact (185) positioned in alignment on a central axis (410) through the die pad (184) and the data communications circuit (318), so that the high speed bus contact (185) is connected directly to the die pad (184) with no intervening conductive pathway. The high speed bus contact (185) may be implemented as a land, pad, via, or other contact of a planar device (408), such as a motherboard, backplane, printed circuit board, or the like, that connects signals from the communications circuit (318) and the die pad (184) to a conductive pathway (302) of a high speed memory bus. In this example, the die pad (184) and the high speed bus contact (185) form a negligible electrical stub connecting a high speed memory bus to a memory hub device.

The integrated circuit die has a plurality of die pads (412) fabricated at regular intervals along its bottom surface to provide electrical connection into the internal circuitry of the integrated circuit die. The planar device (408) has a plurality of planar contacts (414), pads, vias, and the like, fabricated at regular intervals along the surface of the planar device to provide electrical connections from the circuitry of the planar device to the integrated circuit die. The intervals between die pads are different from the intervals between planar contacts. In this example, therefore, not all the planar contacts line up precisely on an axis with die pads. In fact, only one of them does—planar contact (185) lines up precisely on an axis (410) through die pad (184). Planar contact (185) therefore is chosen as a high speed memory bus contact, and the location of the communications circuit on the integrated circuit die is carefully designed to lie under the design location of the die pad (184) that will at flip time lie centered directly on the axis through high speed memory bus contact (185). In this way, the memory hub device in the example of FIG. 7 is fabricated with a high speed bus contact (185) positioned in close proximity to the die pad (184) by positioning the high speed bus contact in alignment on a central axis (410) through the die pad (184) and the data communications circuit (318), so that the high speed bus contact (185) is connected directly to the die pad (184) with no intervening conductive pathway.

Figure 8:
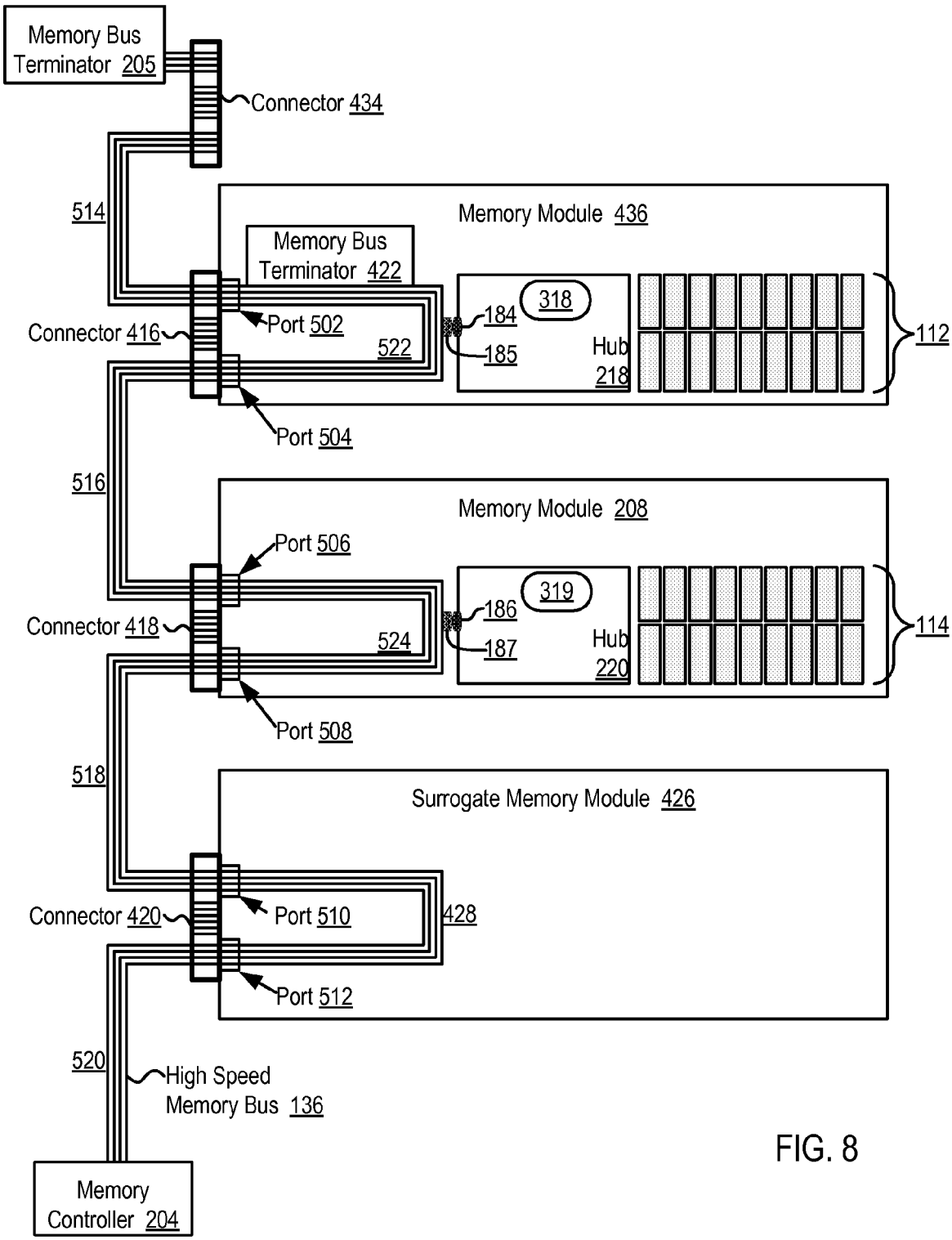
FIG. 8 sets forth a functional block diagram of a memory system for automated computing machinery according to embodiments of the present invention.

For further explanation, FIG. 8 sets forth a functional block diagram of a memory system for automated computing machinery according to embodiments of the present invention. The memory system of FIG. 8 includes a high speed memory bus (136) that connects a memory controller (204) through three connectors (416, 418, 420) to two memory modules (436, 208) and one surrogate memory module (426). In this example, each memory module as well as the surrogate memory module is connected through a bus connector to the memory bus.

Each memory module (436, 208) in this example includes two bus signal ports (502, 504, 506, 508) and a segment (522, 524) of the high speed memory bus fabricated on the memory module so as to interconnect the bus signal ports and the memory hub devices (218, 220). The bus signal ports (502, 504, 506, 508) are interconnections for memory signals between a segment (514, 516, 518) of the high speed memory bus off a memory module and a segment (522, 524) of the high speed memory bus on a memory module. As in the system of FIG. 4, high speed bus contacts (185, 187) in the memory modules and die pads (184, 186) of memory hub devices (218, 220) form negligible electrical stubs, conductive pathways between the high speed memory bus (136) and communications circuits (318, 319) of the memory hub devices that are so short as to have either no significant effect on memory bus impedance or none at all.

Figure 1:
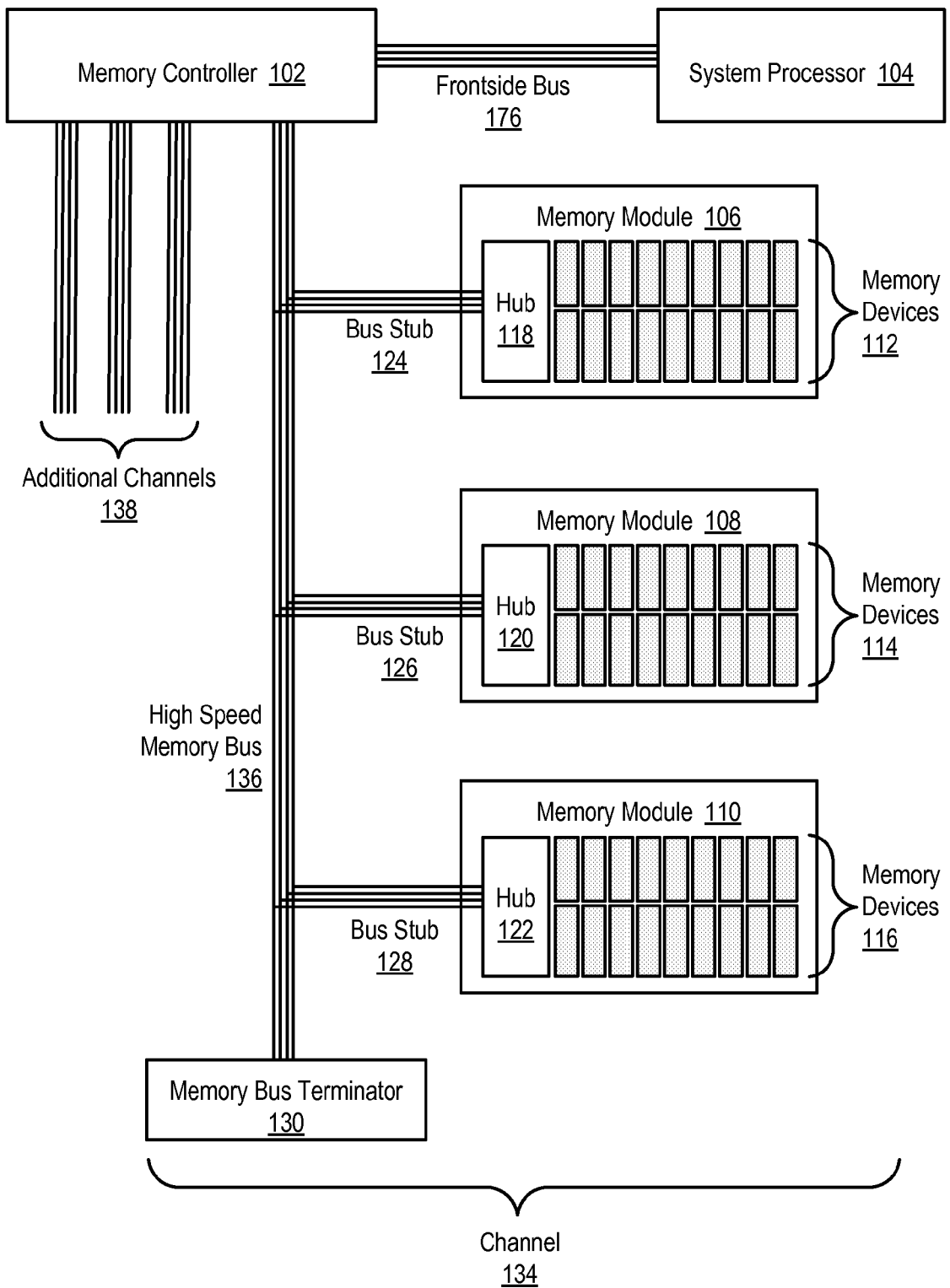
FIG. 1 illustrates an example of a prior art memory system that includes a memory controller, memory modules, memory hub devices, and memory devices organized in a hub-and-spoke topology.

The segments (522, 524) of the high speed memory bus on the memory modules and the segment (428) of the high speed bus on the surrogate memory module are not bus stubs; they are segments of the high speed memory bus itself. By way of contrast, notice that the bus stubs (124, 126, 128) in the system of FIG. 1 are merely parallel connections to a high speed memory bus—not segments of the bus itself. In the system of FIG. 8, like the system of FIG. 4, however, the bus itself is brought onto the memory modules and the surrogate memory module through bus signal ports. Readers of skill in the art will recognize that the memory system architecture illustrated in FIG. 8 effectively implements a high speed wired-OR connection among the memory controller (204) and the memory hub devices (218, 220) on the memory modules (436, 208).

Memory bus connectors (416, 418, 420) may be implemented in various ways as may occur to those of skill in the art, including for example, solder interconnects, conductive adhesives, socket structures, pressure contacts and other methods which enable communication between memory modules, surrogate memory modules, and a high speed memory bus through electrical, optical or alternate means. Memory bus connectors may include mating connectors (male/female), conductive contacts and/or pins on one carrier mating with a male or female connector, optical connections, pressure contacts (including a retaining mechanism) and/or one or more of various other communication and power delivery methods. The interconnection comprising the connector between the high speed memory bus and the memory module or surrogate memory module may be disposed along one or more edges of the memory module or surrogate memory module and/or placed a distance from an edge of the memory module or surrogate memory module—depending on such application requirements as ease-of-upgrade/repair, available space/volume, heat transfer, component size and shape and other related physical, electrical, optical, and visual or physical access requirements of any particular installation.

The system of FIG. 8 includes a memory bus terminator (205) that, like the memory bus terminator in the system of FIG. 4, is fabricated as a device that is separate from any memory module. In this example, also like the example of FIG. 4, the memory hub devices (218, 220) are connected to the high speed memory bus (136) between the memory controller (204) and the memory bus terminator (205). Memory bus connector (434) is left empty in this example to illustrate the fact that a memory architecture that relies on a single separate memory bus terminator at the end of a chain of cascaded memory modules, in order to avoid a harmful impedance mismatch, requires that every memory bus connector in the chain must be populated by a memory module or a surrogate memory module.

One way to avoid such an impedance mismatch is by use of a surrogate memory module such as the one illustrated at reference (426) in FIG. 8. In this example, memory bus connector (420) is populated with a surrogate memory module (426). The surrogate memory module contains no memory and no memory hub device. The surrogate memory module instead provides two bus signal ports (510, 512) directly interconnected by a segment (428) of the high speed memory bus (136). Populating a memory bus connector with a surrogate memory modules therefore removes any potential risk of an impedance mismatch from an unpopulated connector and at the same time continues the memory bus for connections to cascaded memory modules farther from the memory controller.

Another way to avoid such an impedance mismatch is by use of a memory module (436) with an integrated memory bus terminator (422). Using a memory module with an integrated bus terminator may avoid impedance mismatches because memory module (436), the memory module farthest from the memory controller (204) in a cascaded chain of memory modules, includes its own memory bus terminator (422). This architecture works well even if other memory modules have no memory bus terminator, as in this example memory module (208) does not, so long as the last memory module on the high speed memory bus has a memory bus terminator integrated within it.

In addition, a memory system like the one illustrated in FIG. 8 may be fabricated so that each memory module in the system includes a memory bus terminator like the terminator illustrated at reference (422). In such a system, each memory module may include a memory bus terminator that is capable of remotely-controlled activation and deactivation. In such a memory system, it is typical for the memory bus terminator in a memory module in a bus connector farthest from the memory controller in the cascade chain to be activated and all other memory bus terminators to be deactivated. Activation and deactivation of such memory bus terminators may be carried out in-band by message types in the high memory bus's communications protocol. That is, in addition to the usual read, write, and synchronization messages, for example, the protocol may be improved according to embodiments of the present invention to include in-band messages activating and deactivating memory bus terminators. Alternatively, a computer processor may communicate activation and deactivation instructions to memory modules through an out-of-band network such as an I²C bus or a System Management Bus ('SMBus' or 'SMB').

In view of these explanations, readers will recognize that constructing memory systems for automated computing machinery according to embodiments of the present invention provides the following benefits:

All memory signals may be presented equally and simultaneously to all memory modules connected to a high speed memory bus with no need to resynchronize and retransmit signals between cascaded memory hub devices.

With no need to resynchronize and retransmit memory signals between cascaded memory hub devices, the design of memory hub devices may be simplified and memory system power requirements may be reduced.

Termination of a high speed memory bus in its characteristic impedance may be facilitated with a surrogate memory module in any memory bus connector that is not populated with a memory module.

With integrated memory bus terminators in memory modules or in surrogate memory modules and therefore no general requirement for a separate memory bus terminator, memory system design may be further simplified.

In a memory system with a fixed number of memory bus connectors on a high speed memory bus, any combination of memory modules and surrogate memory modules may be inserted and removed with no harmful effect on memory bus impedance, bus noise, crosstalk, or power requirements.

Figure 9:
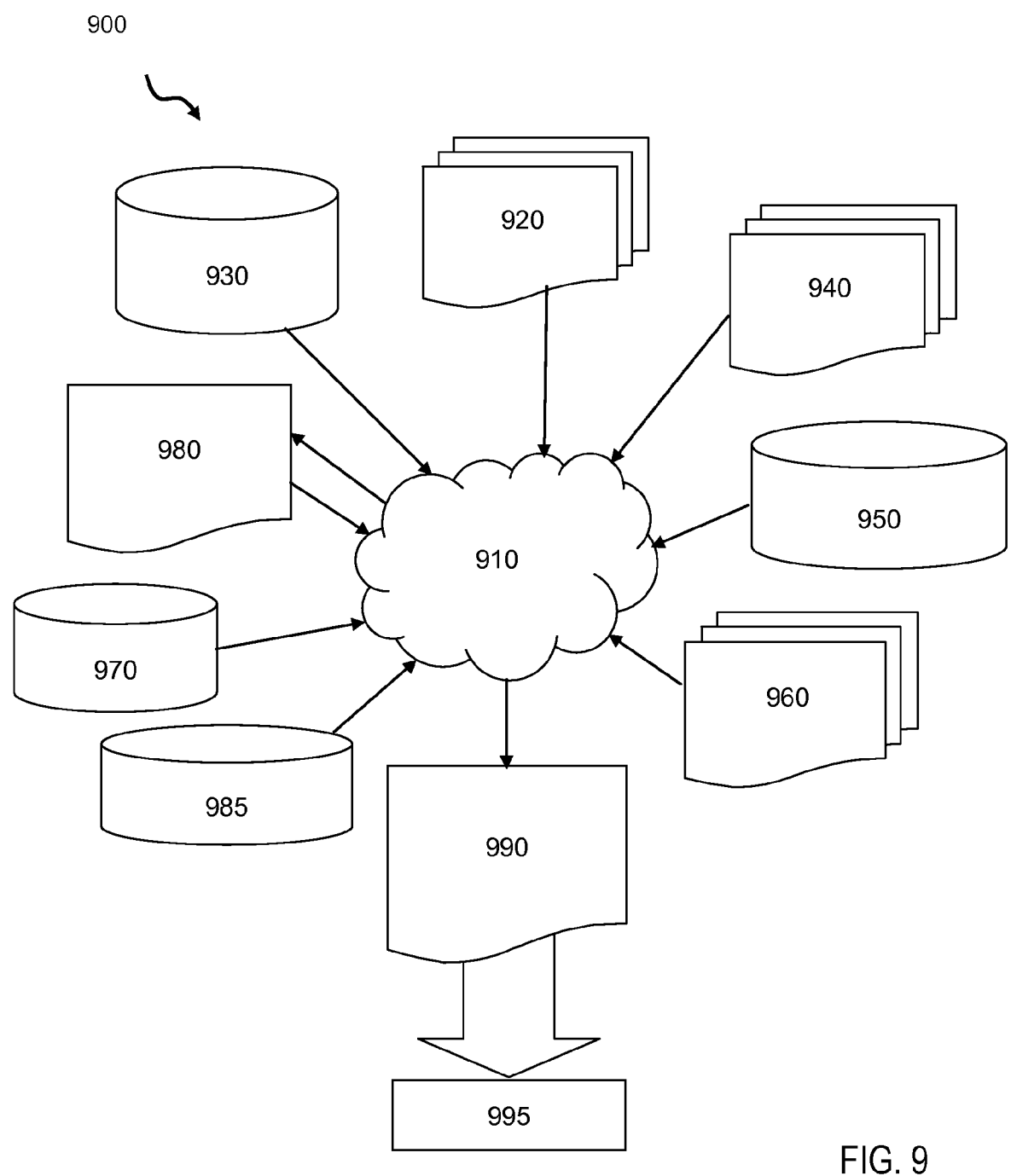
FIG. 9 is a flow diagram of a design process used in semiconductor design, manufacture, and/or test.

For further explanation, FIG. 9 sets forth a block diagram of an example design flow 900 used for example, in semiconductor design, manufacturing, and/or test. Design flow 900 may vary depending on the type of IC being designed. For example, a design flow 900 for building an application specific IC (ASIC) may differ from a design flow 900 for designing a standard component. Design structure 920 is preferably an input to a design process 910 and may come from an IP provider, a core developer, or other design company or may be generated by the operator of the design flow, or from other sources. Design structure 920 comprises an embodiment of the invention as shown in FIGS. 4-8 in the form of schematics or HDL, a hardware-description language (e.g., Verilog, VHDL, C, etc.). Design structure 920 may be contained on one or more machine readable medium. For example, design structure 920 may be a text file or a graphical representation of an embodiment of the invention as shown in FIGS. 4-8. Design process 910 preferably synthesizes (or translates) an embodiment of the invention as shown in FIGS. 4-8 into a netlist 980, where netlist 980 is, for example, a list of wires, transistors, logic gates, control circuits, I/O, models, etc. that describes the connections to other elements and circuits in an integrated circuit design and recorded on at least one of machine readable medium. For example, the medium may be a CD, a compact flash, other flash memory, a packet of data to be sent via the Internet, or other networking suitable means. The synthesis may be an iterative process in which netlist 980 is resynthesized one or more times depending on design specifications and parameters for the circuit.

Design process 910 may include using a variety of inputs; for example, inputs from library elements 930 which may house a set of commonly used elements, circuits, and devices, including models, layouts, and symbolic representations, for a given manufacturing technology (e.g., different technology nodes, 32 nm, 45 nm, 90 nm, etc.), design specifications 940, characterization data 950, verification data 960, design rules 970, and test data files 985 (which may include test patterns and other testing information). Design process 910 may further include, for example, standard circuit design processes such as timing analysis, verification, design rule checking, place and route operations, etc. One of ordinary skill in the art of integrated circuit design can appreciate the extent of possible electronic design automation tools and applications used in design process 910 without deviating from the scope and spirit of the invention. The design structure of the invention is not limited to any specific design flow.

Design process 910 preferably translates an embodiment of the invention as shown in FIGS. 4-8, along with any additional integrated circuit design or data (if applicable), into a second design structure 990. Design structure 990 resides on a storage medium in a data format used for the exchange of layout data of integrated circuits and/or symbolic data format (e.g. information stored in a GDSII (GDS2), GLI, OASIS, map files, or any other suitable format for storing such design structures). Design structure 990 may comprise information such as, for example, symbolic data, map files, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 4-8. Design structure 990 may then proceed to a stage 995 where, for example, design structure 990: proceeds to tape-out, is released to manufacturing, is released to a mask house, is sent to another design house, is sent back to the customer, etc.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A design structure tangibly embodied in a machine readable medium, the design structure comprising:
    a memory system comprising:
    a memory controller;
    a memory bus terminator;
    a high speed memory bus that interconnects the memory controller, the memory bus terminator, and at least one memory module, wherein the high speed memory bus comprises at least one high speed bus contact fabricated in direct contact with a conductive pathway of the high speed memory bus on the memory module; and
    the at least one memory module, the memory module comprising:
        at least one memory hub device, the memory hub device comprising an integrated circuit that includes at least one data communications circuit and a die pad, the data communications circuit connected to the memory bus through the die pad and the high speed bus contact;
        high speed random access memory served by the memory hub device;
        two bus signal ports; and
        a segment of the high speed memory bus fabricated on the memory module so as to interconnect the bus signal ports and the memory hub device, the high speed memory bus connected to the memory hub device by a negligible electrical stub, the negligible electrical stub comprising the high speed bus contact positioned in alignment on a central axis through the die pad and the data communications circuit, the high speed bus contact connected directly to the die pad with no intervening conductive pathway.

2. The design structure of claim 1 wherein the high speed memory bus comprises a memory bus that supports a memory signal characterized by a frequency of at least one gigahertz.

3. The design structure of claim 1 wherein:
    the high speed memory bus is characterized by a characteristic impedance; and
    the negligible electrical stub comprises a conductive pathway between the high speed memory bus and the data communications circuit fabricated so as to have no significant effect on the characteristic impedance of the high speed memory bus.

4. The design structure of claim 1 wherein:
    the high speed memory bus comprises at least one high speed bus contact fabricated in direct contact with a conductive pathway of the high speed memory bus on the memory module;
    the memory hub device comprises an integrated circuit that includes at least one data communications circuit and a die pad, the data communications circuit connected to the memory bus through the die pad and the high speed bus contact; and
    the data communications circuit comprises a receiver circuit, the receiver circuit comprising an input transistor, and
    the negligible electrical stub comprises the die pad fabricated in direct contact with the input transistor with no intervening conductive pathway.

5. The design structure of claim 1 wherein:
    the high speed memory bus comprises at least one high speed bus contact fabricated in direct contact with a conductive pathway of the high speed memory bus on the memory module;
    the memory hub device comprises an integrated circuit that includes at least one data communications circuit and a die pad, the data communications circuit connected to the memory bus through the die pad and the high speed bus contact; and
    the data communications circuit comprises a transmitter circuit, the transmitter circuit comprising an output transistor, and
    the negligible electrical stub comprises the die pad fabricated in direct contact with the output transistor with no intervening conductive pathway.

6. The design structure of claim 1 wherein:
    the memory system comprises two or more such memory modules;
    the memory system comprises bus connectors, each memory module connected through a bus connector to the memory bus;
    the memory bus terminator is fabricated as a device that is separate from any memory module.

7. The design structure of claim 1 wherein;
    the memory system comprises two or more such memory modules;
    the memory system comprises bus connectors, each memory module connected through a bus connector to the memory bus; and
    a memory module in a connector farthest from the memory controller comprises the memory bus terminator.

8. The design structure of claim 1 wherein:
    the memory system comprises two or more such memory modules;
    the memory system comprises bus connectors, each memory module connected through a bus connector to the memory bus;
    each memory module comprises a memory bus terminator, each memory bus terminator capable of remotely-controlled activation and deactivation; and
    the memory bus terminator in a memory module in a bus connector farthest from the memory controller is activated and all other memory bus terminators are deactivated.

9. The design structure of claim 1 wherein:
    the memory system comprises two or more such memory modules;
    the memory system comprises bus connectors, each memory module connected through a bus connector to the memory bus; and
    at least one of the bus connectors is populated with a surrogate memory module containing no memory and no memory hub device, the surrogate memory module comprising two bus signal ports interconnected by a segment of the high speed memory bus, the surrogate memory module having no memory hub device and no high speed random access memory.

10. The design structure of claim 1 wherein the negligible electrical stub comprises a conductive pathway no more than 2.0 millimeters in length between the high speed memory bus and the data communications circuit.

11. The design structure of claim 1 wherein:
the high speed memory bus comprises at least one high speed bus contact fabricated in direct contact with a conductive pathway of the high speed memory bus on the memory module;
the memory hub device comprises an integrated circuit that includes at least one data communications circuit and a die pad, the data communications circuit connected to the memory bus through the die pad and the high speed bus contact; and
the negligible electrical stub comprises the high speed bus contact connected directly to the die pad forming a conductive pathway no more than 2.0 millimeters in length between the conductive pathway of the high speed memory bus and the data communications circuit.

12. The design structure of claim 1 wherein:
the high speed memory bus comprises at least one high speed bus contact fabricated in direct contact with a conductive pathway of the high speed memory bus on the memory module;
the memory hub device comprises an integrated circuit that includes at least one data communications circuit and a die pad, the data communications circuit connected to the memory bus through the die pad and the high speed bus contact; and
the data communications circuit comprises a receiver circuit, the receiver circuit comprising an input transistor, the die pad fabricated upon the input transistor, and
the negligible electrical stub comprises the high speed bus contact connected directly to the die pad forming a conductive pathway no more than 2.0 millimeters in length between the conductive pathway of the high speed memory bus and the input transistor.

13. The design structure of claim 1 wherein:
the high speed memory bus comprises at least one high speed bus contact fabricated in direct contact with a conductive pathway of the high speed memory bus on the memory module;
the memory hub device comprises an integrated circuit that includes at least one data communications circuit and a die pad, the data communications circuit connected to the memory bus through the die pad and the high speed bus contact; and
the data communications circuit comprises a transmitter circuit, the transmitter circuit comprising an output transistor, the die pad fabricated upon the input transistor, and
the negligible electrical stub comprises the high speed bus contact connected directly to the die pad forming a conductive pathway no more than 2.0 millimeters in length between the conductive pathway of the high speed memory bus and the output transistor.

* * * * *